United States Patent
Lee et al.

(10) Patent No.: US 7,663,681 B2
(45) Date of Patent: Feb. 16, 2010

(54) CMOS ACTIVE PIXEL AND METHOD OF DRIVING THE SAME

(75) Inventors: Do Young Lee, Seongnam-si (KR); Kwang Ho Yoon, Suwon-si (KR)

(73) Assignee: Siliconfile Technologies Inc., Seoul (KR)

( * ) Notice: Subject to any disclaimer, the term of this patent is extended or adjusted under 35 U.S.C. 154(b) by 495 days.

(21) Appl. No.: 10/544,739

(22) PCT Filed: Feb. 7, 2004

(86) PCT No.: PCT/KR2004/000236

§ 371 (c)(1),
(2), (4) Date: Aug. 8, 2005

(87) PCT Pub. No.: WO2004/071078

PCT Pub. Date: Aug. 19, 2004

(65) Prior Publication Data

US 2006/0139471 A1    Jun. 29, 2006

(30) Foreign Application Priority Data

Feb. 7, 2003    (KR)    ...... 10-2003-0007738
Mar. 15, 2003    (KR)    ...... 10-2003-0016272

(51) Int. Cl.
*H04N 5/335* (2006.01)
*H01L 27/00* (2006.01)

(52) U.S. Cl. ............ 348/308; 348/302; 250/208.1

(58) Field of Classification Search ............ 348/308, 348/302; 396/362; 257/291–292; 250/208.1
See application file for complete search history.

(56) References Cited

U.S. PATENT DOCUMENTS

| | | | |
|---|---|---|---|
| 5,524,036 A * | 6/1996 | Miwada | 377/63 |
| 6,320,617 B1 * | 11/2001 | Gee et al. | 348/302 |
| 6,346,696 B1 | 2/2002 | Kwon | 250/208.1 |
| 6,421,085 B1 | 7/2002 | Xu | 348/308 |
| 6,423,957 B1 | 7/2002 | Kim et al. | 250/208.1 |
| 6,548,798 B2 * | 4/2003 | Yoneda et al. | 250/208.1 |
| 2004/0081446 A1 * | 4/2004 | Compton | 396/362 |
| 2004/0196398 A1 * | 10/2004 | Doering et al. | 348/308 |

OTHER PUBLICATIONS

PCT International Search Report; PCT/KR2004/000236; Dated: Feb. 7, 2003.
Written Opinion of the International Searching Authority of Corresponding PCT Application: PCT/KR2004/000236; Dated: Jun. 12, 2004.

* cited by examiner

*Primary Examiner*—Lin Ye
*Assistant Examiner*—Mekonnen Dagnew

(57) ABSTRACT

In a driving method of a complementary metal oxide semiconductor active pixel, timing of a transmission control signal and a reset control signal generated in a read-out section is performed in advance in a reset section. A potential wall between a photodiode area and a transmission transistor having a size corresponding to one generated in the read-out section is generated in the reset section in advance and the photodiode area is filled with charges. A dead region is reduced in the read-out section. In the reset section, the transmission transistor connecting a collection node to accumulate the signal charges generated from the photodiode and the floating diffusive node is turned on at least one time, and a difference between an initial voltage of the collection node and a voltage of the reset level of the floating diffusive node is reduced.

4 Claims, 11 Drawing Sheets

CMOS ACTIVE PIXEL AND METHOD OF DRIVING THE SAME

TECHNICAL FIELD

The present invention relates to an image sensor, and more particularly, to a pixel of a CMOS (complementary metal oxide semiconductor) image sensor and a method of driving the same

BACKGROUND ART

An image sensor captures an image by using a semiconductor device's feature of reacting to external energy, for example, photons. Light generated from an object existing in nature has an intrinsic energy value in a wavelength thereof. A pixel of the image sensor detects the light generated from the object and converts the detected light to an electric value.

FIG. 1 is a timing diagram of driving an image sensor using a 4-transistor CMOS active pixel, in which data is read out in a correlated double sampling (CDS) method. FIG. 2 is a view illustrating the conventional 4-transistor CMOS active pixel to explain a section of a photodiode and an electronic potential for each area based on the timing diagram of FIG. 1.

Referring to FIG. 2, the 4-transistor CMOS active pixel includes a transmission transistor 11 to connect a photodiode area A1 and a floating diffusion node area A3, and a reset transistor 13 to initialize the photodiode area A1. A photodiode PH is formed to a predetermined depth from a surface of a semiconductor which is a dark current source, to reduce dark current. Thus, a potential wall or a potential well is formed in a portion K to connect the transmission transistor 11 and the photodiode PH according to the state of injection of a semiconductor impurity.

Since the potential well characteristically makes electric charges remain as they are, most semiconductor manufacturing companies manufacture pixels in the form of the potential wall while excluding the potential well form. Also, semiconductor manufacturing companies have developed to improve a process to minimize the potential wall. However, since the size of the potential wall varies according to a difference in processing conditions, it is very difficult to remove the potential wall with a processing technology.

As the potential wall is larger, the amount of electric charges which do not move to the floating diffusion node FD and remain in the photodiode pH increases so that a dead region of an image sensor increases. The increase of the dead region is more remarkable when data is read out by using the correlated double sampling method as shown in FIG. 1. In FIG. 1, a reset sampling signal RSH is a signal to sample and store reset data, i.e., an electric potential in the initial state of a floating diffusive node FD. A signal sampling signal DSH is a signal to sample and store signal data, i.e., an electric potential of the floating diffusive node after charges generated from the photodiode PH are received.

In the electronic potential shown in FIG. 2, a solid line n1 indicates an electronic potential in a state in which the transmission transistor 11 and the reset transistor 13 are all turned on, that is, in a reset section of FIG. 1. As it can be seen by the solid line n1 in FIG. 2, even when the transmission transistor 11 and the reset transistor 13 are all turned on, a predetermined amount of extra charges remain in the photodiode area A1 by the potential wall w1 formed at a boundary surface K between the photodiode PH and the transmission transistor area A2. In this state, when the transmission transistor 11 is turned off, a detection operation of the photodiode Ph is initiated at a point t1. When the detection operation is terminated and a detected signal charge is read out, a reset transistor GRX is turned off to isolate the floating diffusive node FD at a point t2. Then, the electric potential of the floating diffusive node FD is lowered. As a result, when the transmission transistor 11 is turned on at a point t3 the potential wall at the boundary surface K between the photodiode PH and the transmission transistor 11 becomes an amount "w1+w2" higher than in a reset state, that is, a case indicated by the solid line n1. (The electric potential at the point t3 is shown by a dotted line n2 of FIG. 2.) Thus, when the transmission transistor 11 is turned on to read out signal data, charges generated in the initial state remain in the photodiode area A1 until the electric potential of the photodiode Ph becomes an amount "w1+w2". That is, the dead region of a pixel continues.

FIG. 3 is another timing diagram of driving an image sensor using the 4-transistor CMOS active pixel. Referring to FIG. 3, a convention method of driving an image sensor using a 4-transistor CMOS active pixel is described below. First, as a transmission control signal TX in a section T11 is deactivated (t11), a collection node that is a port at the N side of the photodiode PH is electrically separated from an external power voltage. In a section T12, the photodiode PH collects signal charges generated in response to light at the collection node. In a section T13, when a reset control signal RX is deactivated as "low" (t12) and a sampling signal SH is primarily activated (SH1), a voltage level of a data line that is an output port of an active pixel is sampled. The voltage level of the sampled data line is a voltage dropped by a predetermined drop voltage from a voltage of the floating diffusive node FD that is a reset level vrst. The drop voltage indicates a threshold voltage of a driving transistor which is gated by the floating diffusive node FD.

In a section T14, during which the transmission control signal TX is activated as "pulse" (t13), the charges at the collection node are transferred to the floating diffusive node FD. Thus, the voltages at the floating diffusive node and the collection node become a data level vdat generated by a charge sharing phenomenon. Then, the voltage level of the data line is sampled in response to a second activating pulse SH2 of the sampling signal SH. The voltage of the sampled data line becomes a voltage dropped by the drop voltage from the voltage at the floating diffusive node that is the data level vdat, like the reset level.

Consequently, a difference between the voltage levels of data lines sampled by the first activation SH1 and the second activation SH2 of the sampling signal SH is the same as a difference (vrst-vdat) between the reset level vrst and the data level vdat.

However, according to the conventional method of driving an active pixel of an image sensor, the reset level vrst is a voltage dropped by a first threshold voltage VT1 from the external power voltage VDD. The first threshold voltage VT1 is a threshold voltage of a reset transistor which is gated by the reset control signal RX and electrically connects the floating diffusive node FD to an external power voltage port. The initial voltage of the collection node is a voltage dropped from the external power voltage VDD by a value which is greater between the first threshold voltage VT1 and the second threshold voltage VT2. The second threshold voltage VT2 is a threshold voltage of the transmission transistor which is gated by the transmission control signal TX and connects the collection node to the floating diffusive node.

According to general image sensor design and manufacturing processes, a case in which the second threshold voltage VT2 is greater than the first threshold voltage VT1 occurs. In this case, while the reset level vrst is determined by the first threshold voltage VT1, the initial voltage of the collection node is determined by the second threshold voltage VT2.

A considerable deviation may occur in the first threshold voltage VT1 and the second threshold voltage VT2 according to the image sensor manufacturing process. As a result, the difference between the initial voltage at the collection node and the reset level vrst becomes irregular.

In the conventional method of reading out data of an image sensor by using the correlated double sampling method, the difference between the initial voltage at the collection node and the reset level vrst becomes irregular so that a low brightness feature of the image sensor is deteriorated.

DISCLOSURE OF INVENTION

To solve the above and other problems, the present invention provides a CMOS active pixel and a driving method thereof which reduces a dead region of a pixel in the initial state by performing, in advance, timing of the transmission control signal and the reset control signal, which may be generated in the read-out section, in the reset section.

Also, the present invention provides a method of driving a CMOS active pixel which reduces a difference between the initial voltage of the collection node and the reset level vrst of the floating diffusive node.

According to one aspect of the present invention, a CMOS active pixel including a photodiode generating signal charges according to received photons, a transmission transistor providing the signal charges to a predetermined floating diffusive node in response to a transmission control signal activated during a read-out section of an image sensor, the floating diffusive node receiving the signal charges transmitted by the transmission transistor, a reset transistor resetting the floating diffusive node in response to a reset control signal activated in a predetermined reset section that does not overlap the read-out section, a driving transistor controlled by a voltage level of the floating diffusive node, and a select transistor transmitting the voltage transmitted by the driving transistor to a corresponding data line in response to a predetermined row select signal, is driven by performing a section A to initialize the photodiode by simultaneously turning on the reset transistor and the transmission transistor, performing a section B to generate a timing of the reset control signal and the transmission control signal, before entering a section C to sense electrons generated from the photodiode, and performing the sensing operation of the section C and performing a section D (a read-out section) to read out the charges stored in the photodiode.

According to another aspect of the present invention, a CMOS active pixel included in an image sensor comprises a photodiode generating signal charges according to received photons, a transmission transistor providing the signal charges to a predetermined floating diffusive node in response to a transmission control signal activated during a read-out section of an image sensor, the floating diffusive node receiving the signal charges transmitted by the transmission transistor, a reset transistor resetting the floating diffusive node in response to a reset control signal activated in a predetermined reset section that does not overlap the read-out section, a driving transistor controlled by a voltage level of the floating diffusive node, a select transistor transmitting the voltage transmitted by the driving transistor to a corresponding data line in response to a predetermined row select signal, and a control signal generator generating the reset control signal and the transmission control signal, wherein the reset section is a timing section of the reset control signal and the transmission control signal generated in the read-out section, and includes the timing section of the reset control signal and the transmission control signal to form a potential wall corresponding to a size of the potential wall formed between the photodiode and the transmission transistor.

According to yet another aspect of the present invention, a CMOS active pixel including a photodiode generating signal charges according to received photons at a predetermined collection node, a transmission transistor providing the signal charges to a predetermined floating diffusive node in response to a predetermined transmission control signal, the floating diffusive node receiving the signal charges transmitted by the transmission transistor, a reset transistor resetting the floating diffusive node in response to a predetermined reset control signal, a driving transistor controlled by a voltage level of the floating diffusive node, and a select transistor transmitting the voltage transmitted by the driving transistor to a corresponding data line in response to a predetermined row select signal, is driven by performing a reset sampling section to sample a reset level of the data line according to a voltage of the reset floating diffusive node, performing a data sampling section to transmit the signal charges generated in the photodiode to the floating diffusive node and sample a data level of the data line according to a voltage of the floating diffusive node which is determined by the signal charges, and performing a preliminary section to match the voltage of the collection node before the data sampling action is performed and the voltage of the floating diffusive node after the a data sampling action is performed, wherein the preliminary section comprises a first equalization region in which the reset control signal is deactivated and the transmission control signal is activated.

According to yet further another aspect of the present invention, a CMOS active pixel including a photodiode generating signal charges according to received photons at a predetermined collection node, a transmission transistor providing the signal charges to a predetermined floating diffusive node in response to a predetermined transmission control signal, the floating diffusive node receiving the signal charges transmitted by the transmission transistor, a reset transistor resetting the floating diffusive node in response to a predetermined reset control signal, a driving transistor controlled by a voltage level of the floating diffusive node, and a select transistor transmitting the voltage transmitted by the driving transistor to a corresponding data line in response to a predetermined row select signal, is driven by performing a reset sampling section to sample a reset level of the data line according to a voltage of the reset floating diffusive node, after the reset sampling action, performing a data sampling section to transmit the signal charges generated in the photodiode to the floating diffusive node and sample a data level of the data line according to a voltage of the floating diffusive node which is determined by the signal charges, and performing a preliminary section to match the voltage of the collection node before the data sampling action is performed and the voltage of the floating diffusive node after the data sampling action is performed, wherein the preliminary section comprises a preparation region in which the reset control signal is deactivated in a state in which the transmission control signal is deactivated.

BEST MODE FOR CARRYING OUT THE INVENTION

Figure 4:
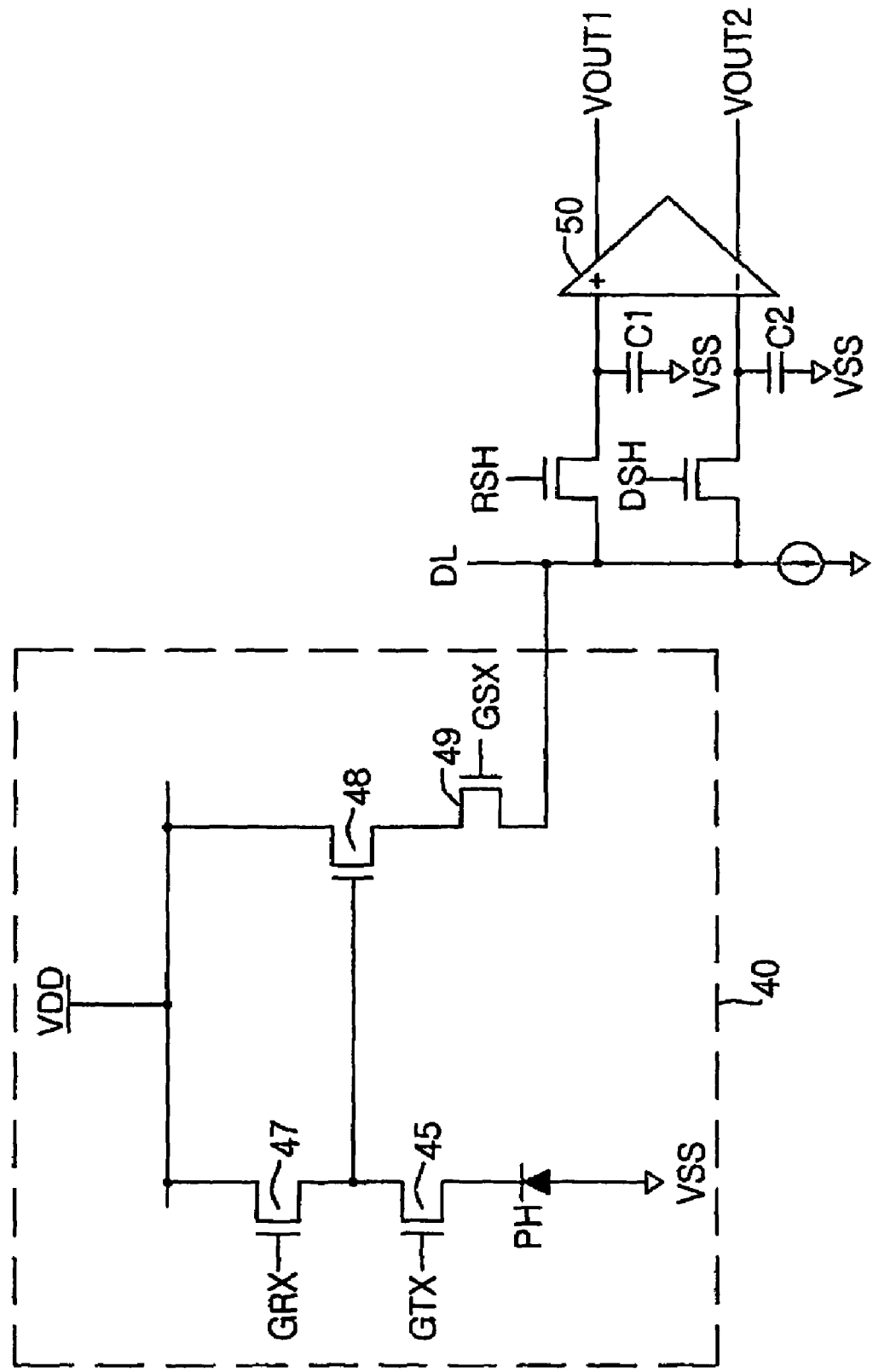
FIG. 4 is a circuit diagram of an image sensor using a 4-transistor CMOS active pixel according to a preferred embodiment of the present invention.

FIG. 4 is a circuit diagram of an image sensor using the 4-transistor CMOS active pixel. Referring to FIG. 4, a 4-transistor CMOS active pixel 40 includes a photodiode PH, a transmission transistor 45, a reset transistor 47, a floating diffusive node FD, a driving transistor 48, and a select transistor 49.

The photodiode PH generates signal charges according to the received photons. Preferably, the photodiode PH has a P-I-N (P-type semiconductor-intrinsic semiconductor-N-type semiconductor) structure. That is, an intrinsic semiconductor layer is formed at a boundary of a PN junction by forming an impurity layer by injecting N-type impurity formed in a P-well or P-type substrate. Since the photodiode PH having the above P-I-N structure forms the PN junction at both lower and upper boundary surfaces of the N-type impurity layer, a quantum efficiency is improved.

The transmission transistor 45 is gated by a predetermined transmission control signal GTX. Thus, when the transmission control signal GTX is activated, the photodiode PH forms a current path to the floating diffusive node FD. The floating diffusive node FD receives the signal charges generated in the photodiode PH.

The reset transistor 47 is gated by a predetermined reset control signal GRX. That is, when the reset control signal GRX is activated to "high", the reset transistor 47 emits charges remaining at the floating diffusive node FD toward a power voltage VDD. Thus, when the reset control signal GRX is activated and the transmission control signal GTX is activated to "high", the potential energy of a photodiode PH area is initialized.

The driving transistor 48 is gated by the floating diffusive node FLOATING DIFFUSIVE NODE FD. That is, the driving transistor 48 is controlled by a voltage level of the floating diffusive node FD so that a voltage level transmitted to a data line DL is determined.

The select transistor 49 transmits the voltage transmitted from the driving transistor 48 to the data line DL corresponding to a column of the CMOS active pixel 40, in response to a predetermined row selection signal GSX. The row selection signal GSX is a signal to select a row including the CMOS active pixel 40. When the row selection signal GSX is activated, data of all CMOS active pixels in the same row are transmitted to the data line DL.

A voltage of the data line DL corresponds to a reset sampling signal RSH and a data sampling signal DSH and a reset voltage and a data voltage are sampled and stored in a first capacitor C1 and a second capacitor C2, respectively. The stored reset voltage and data voltage are compared by a comparator 50 so that a first output signal VOUT1 and a second output signal VOUT2 are generated.

Figure 5:
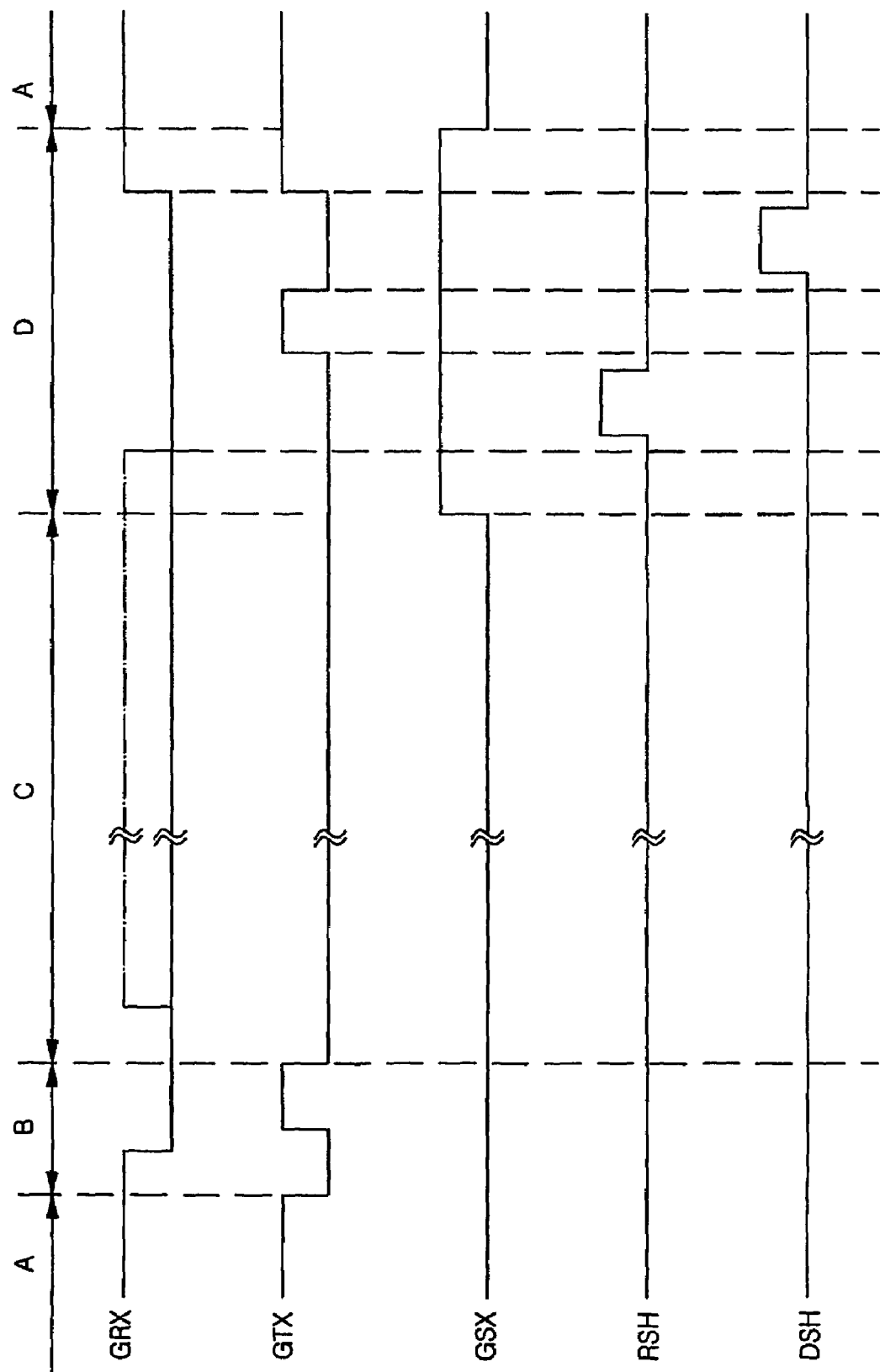
FIG. 5 is a timing diagram of signals to drive the image sensor using the 4-transistor CMOS active pixel of FIG. 4 according to a preferred embodiment of the present invention.

FIG. 5 is a timing diagram of signals to drive the image sensor using the 4-transistor CMOS active pixel of FIG. 4 according to a preferred embodiment of the present invention. Referring to FIG. 5, during a section A where light is not sensed, the reset transistor GRX and the transmission transistor GX are simultaneously turned on. Thus, the photodiode PH is initialized in the section A. Before a section C where photons generated by the photodiode PH, a section B continues where timing of the reset control signal GRX and the transmission control signal GTX are generated.

The characteristic feature of the present invention lies in the section B. The timing of the section B is to form a potential wall of the photodiode PH and the transmission transistor 45 having the same size as that of the section D, in consideration of the timing of a section D where data according to the sensed photons is read out.

To form such a potential wall, the section B generates a timing under the same conditions of the section D when data is read out. That is, during the section B, the transmission transistor 45 is turned on and off in a state in which the reset transistor 47 is turned off. Due to this timing operation, unlike the prior art, the potential wall of the photodiode PH and the transmission transistor 45 is raised.

Thus, before the section C begins, the electric potential at a boundary surface between the photodiode PH and the transmission transistor 45 is raised in advance as much as that formed in the section D. Thus, as in the read-out operation in the section D, photons fill the photodiode PH in advance during the section C as much as the amount of charges which have not escaped due to the potential wall (w1+w2) when the data according to the photons generated in the photodiode PH is read out.

Then, the reset transistor 47 can maintain a turn-off state or be turned on again. When the reset transistor 47 is maintained in the turn-off state, generation of dark current is reduced so that a loss in power can be reduced on the whole.

The sensing operation in the section C is terminated and the charges stored in the photodiode PH are read out according to the timing diagram of the section D of FIG. 5. That is, the reset sampling signal RSH and the signal sampling signal DSH are activated and the data of a pixel is output in a correlated double sampling (CDS) method.

In the present specification, a section of the section A plus the section B is referred to as "a reset section" and the section C and the section D are referred to as "a sensing section" and "a read-out section", respectively.

Figure 6:
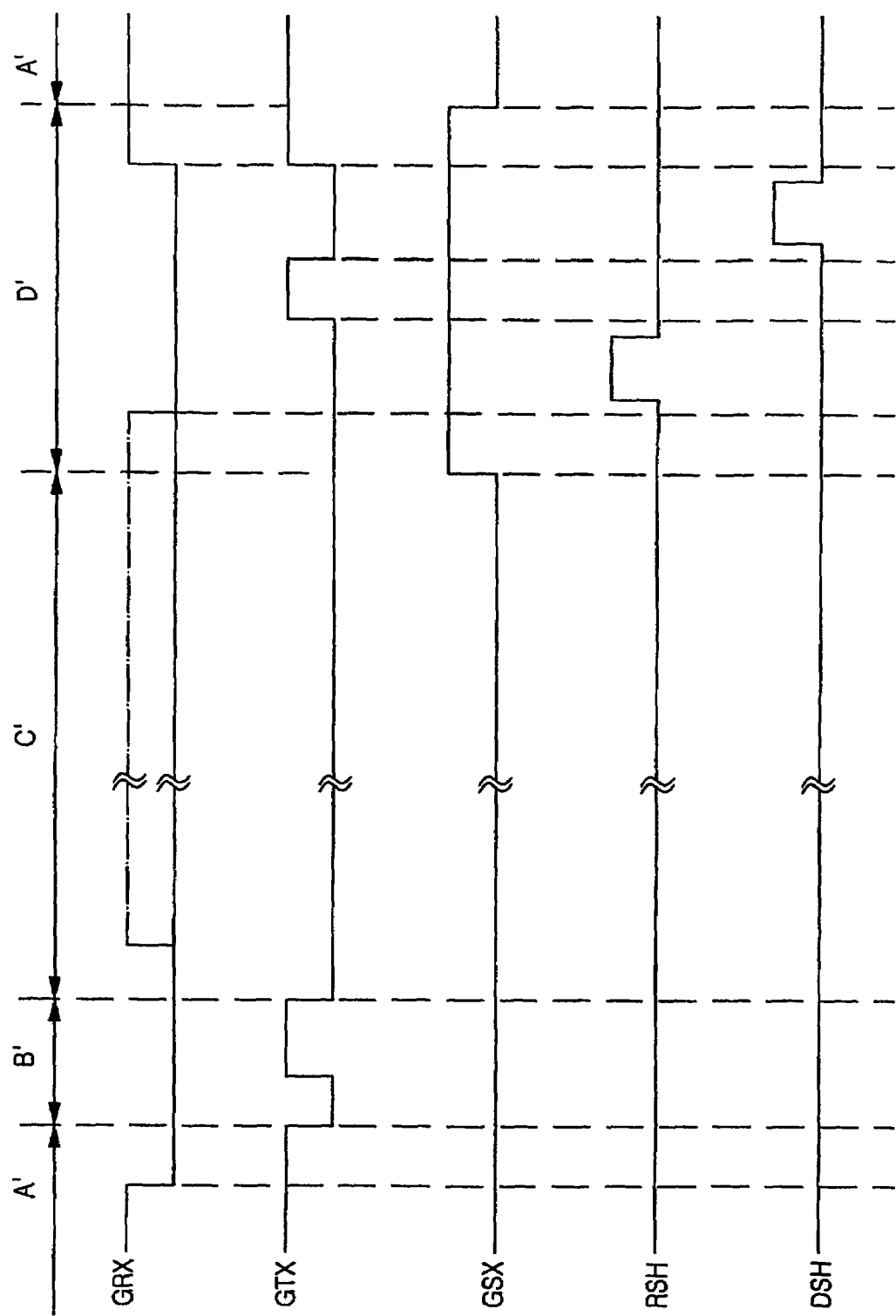
FIG. 6 is a timing diagram obtained by modifying the timing diagram of FIG. 5.

FIG. 6 is a timing diagram obtained by modifying the timing diagram of FIG. 5, which shows that the present invention can be normally performed even when a deactivation point of the transmission control signal GTX in the reset section is delayed so that the width of a section B' slightly decreases.

To summarize the operations of the reset control signal GRX and the transmission control signal GTX shown in FIGS. 5 and 6, a section in which the reset control signal GRX maintains a deactivated state and the transmission control signal GTX is activated and then deactivated is included in both the reset section (the section B) and the read-out section (the section D).

Figure 7:
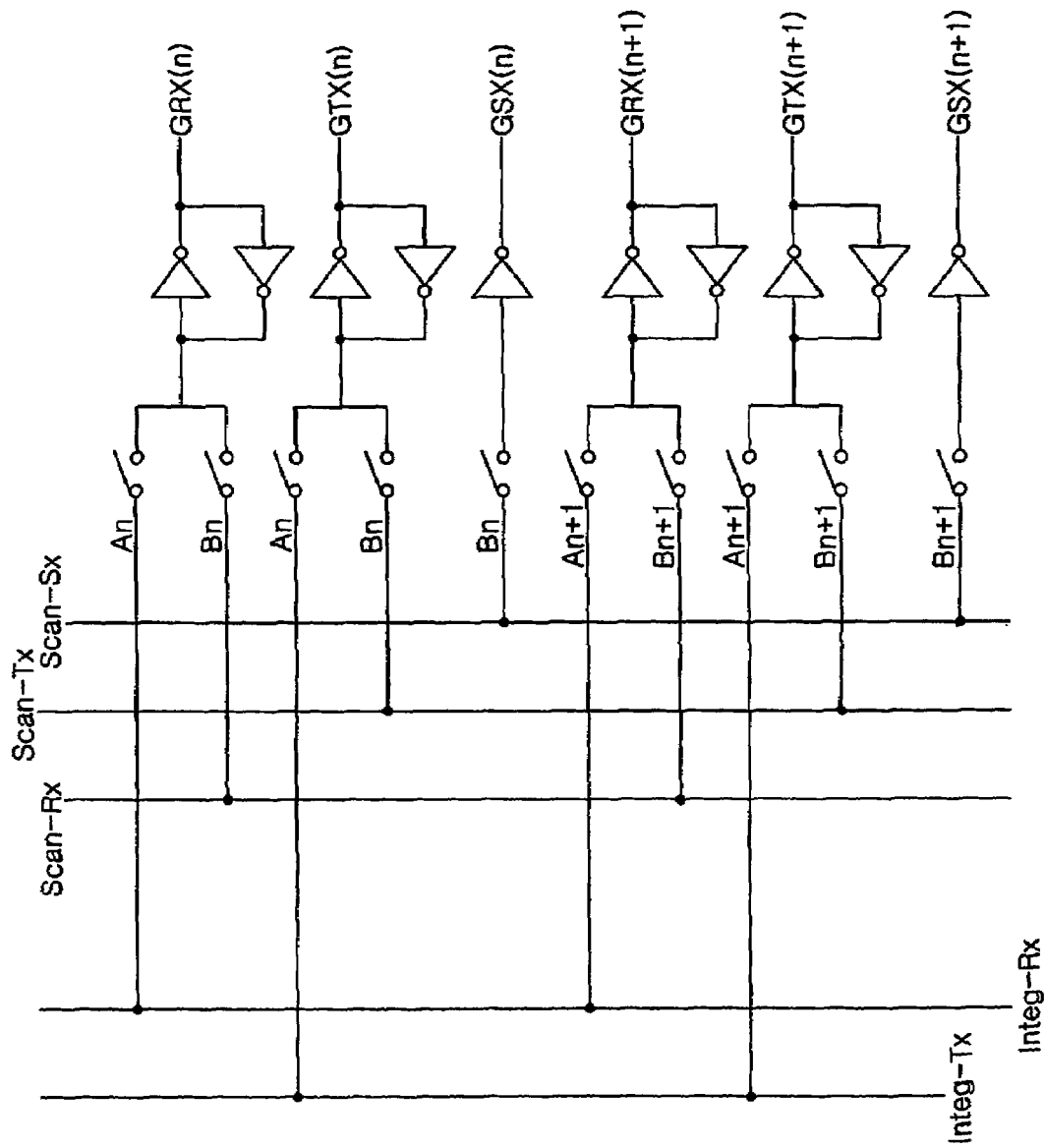
FIG. 7 is a circuit diagram showing an example of a control signal generator which generates a transmission control signal and a reset control signal of the timing diagram of FIG. 5.

To separately control the timing of the section B and the timing of the section D, a control signal generator as shown in FIG. 7 is needed. In FIG. 7, an integral transmission signal Integ-TX and an integral reset signal Integ-RX are signal lines to apply the control signals in the section B of FIGS. 5 and 6 to the pixel. That is, the control signal generator of FIG. 7 is controlled by the integral transmission signal Integ-TX and the integral reset signal Integ-RX which control the reset section, to generate control signals in the section B. As in a typical case, a scan transmission control signal Scan-TX, a scan reset signal Scan-RX, and a scan select signal Scan-Sx are provided to the control signal generator of FIG. 7. The scan transmission control signal Scan-TX, the scan reset signal Scan-RX, and the scan select signal Scan-Sx are signals to apply the control signals in the section D of FIGS. 5 and 6 to the pixel. In the drawing, "n" in parenthesis is a corresponding row of a sensor array, "An" and "An+1" are signal to select a particular row in the reset section, and "Bn" and "Bn+1" are signals to select a particular row in the read-out section.

Figure 8:
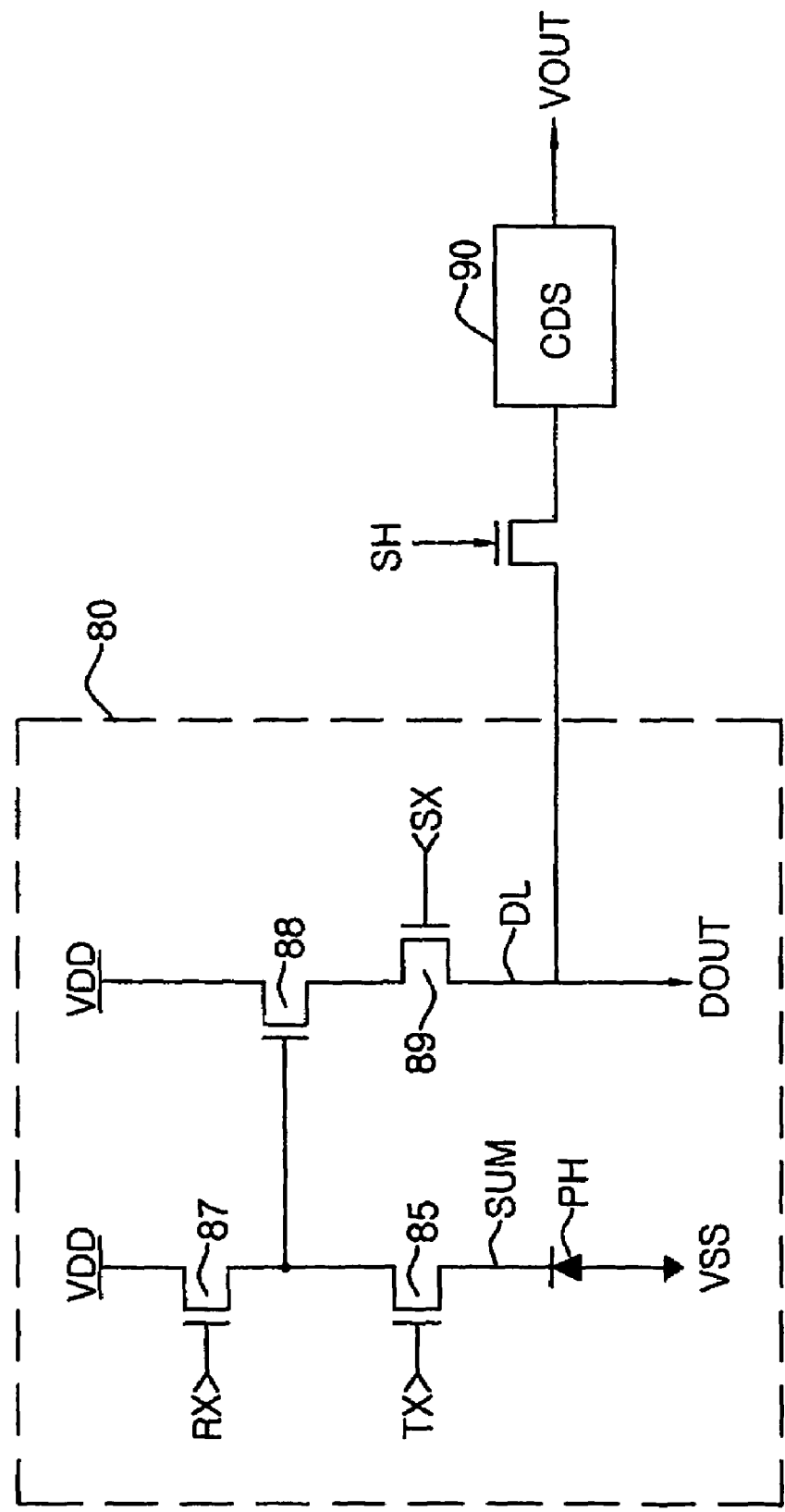
FIG. 8 is a circuit diagram of an image sensor using a 4-transistor CMOS active pixel according to another preferred embodiment of the present invention.

FIG. 8 is a circuit diagram of an image sensor using a 4-transistor CMOS active pixel according to another preferred embodiment of the present invention. Referring to FIG. 8, a 4-transistor CMOS active pixel 80 according to another preferred embodiment of the present invention includes a photodiode PH, a transmission transistor 85, a reset transistor 87, a floating diffusive node FD, a driving transistor 88, and a select transistor 89.

Signal charges are formed in the photodiode PH according to received photons. A port at an N side of the photodiode PH is referred to as a collection node SUM. Thus, the signal charges generated in the photodiode PH are collected at the collection node SUM. The transmission transistor 85 is gated in response to a predetermined transmission control signal TX. The transmission control signal TX is activated to "high". Then, the signal charges collected at the collection node SUM are transmitted to the floating diffusive node FD. The floating diffusive node FD receives the signal charges generated from the photodiode PH. When the transmission control signal TX is deactivated to "low", the collection node SUM is electrically separated from the floating diffusive node FD and an external power voltage VDD.

The reset transistor 87 is gated in response to a reset control signal RX. When the reset control signal RX is activated to "high", charges remaining at the floating diffusive node FD are discharged to the external power voltage VDD. Thus, when the reset control signal RX is activated and the transmission control signal TX is activated to "high", the collection node SUM is initialized.

The driving transistor 88 is gated by the floating diffusive node FD and determines a voltage level transmitted to a data line DL. That is, a voltage level of the data line DL is a voltage dropped by a threshold voltage of the driving transistor 88 from a voltage level of the floating diffusive node FD.

The select transistor 89 transmits a voltage transmitted by the driving transistor 88 to the data line DL corresponding to a column of the CMOS pixel 80 in response to a predetermined row select signal SX. The row select signal SX is a signal to select a row including the CMOS active pixel 80. When the row select signal SX is activated, data of all CMOS active pixels in the same row are transmitted to the respective data lines.

A voltage of the data line DL corresponding to each of a reset level and a data level is sampled in response to a first activation and a second activation of a sampling signal SH. The sampled voltage of the data line DL is sampled by a correlated double sampling circuit (CDS) 90 so that an output signal VOUT is generated in a correlated double sampling method.

Figure 1:
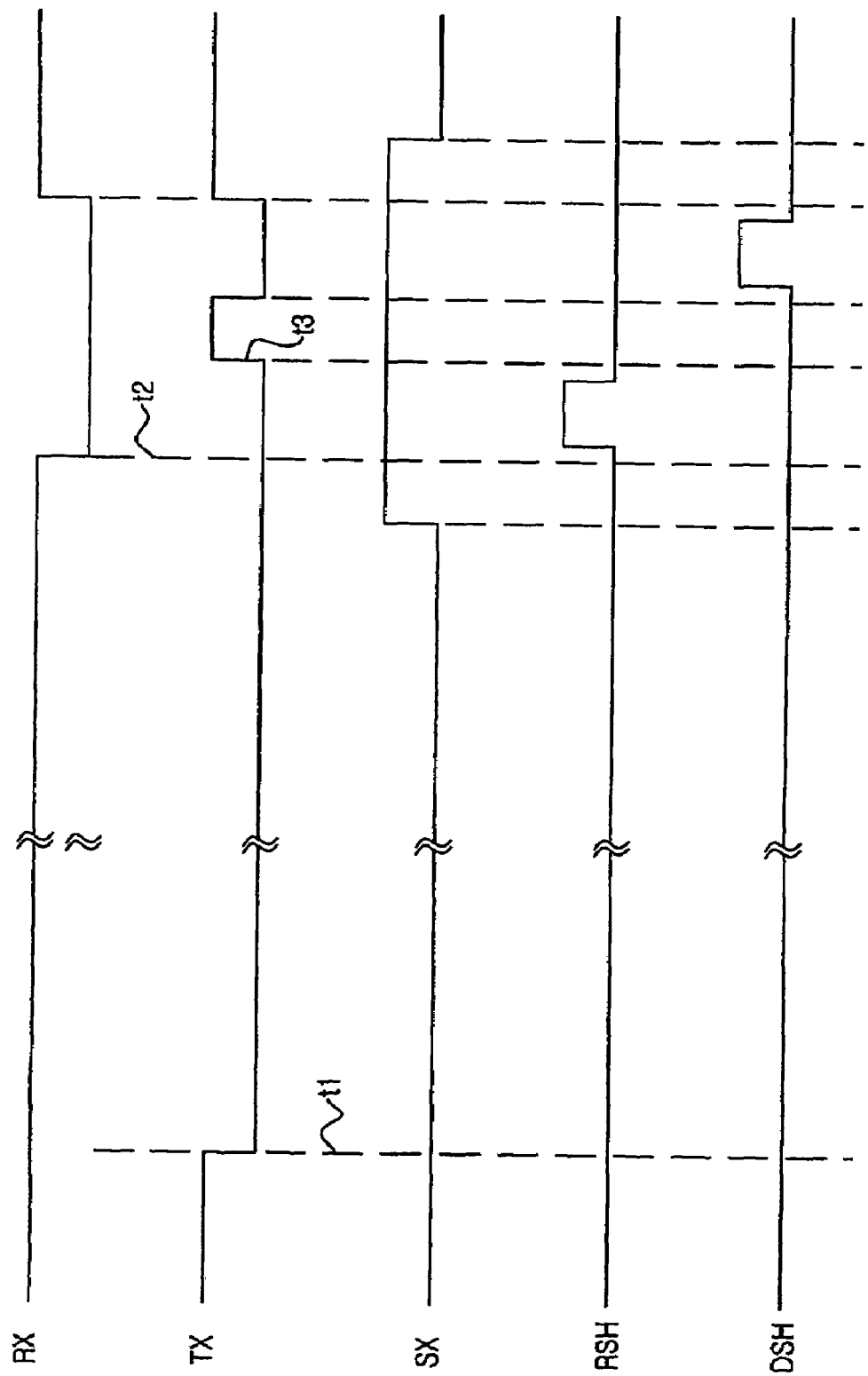
FIG. 1 is a timing diagram of driving an image sensor using a 4-transistor CMOS active pixel.
Figure 2:
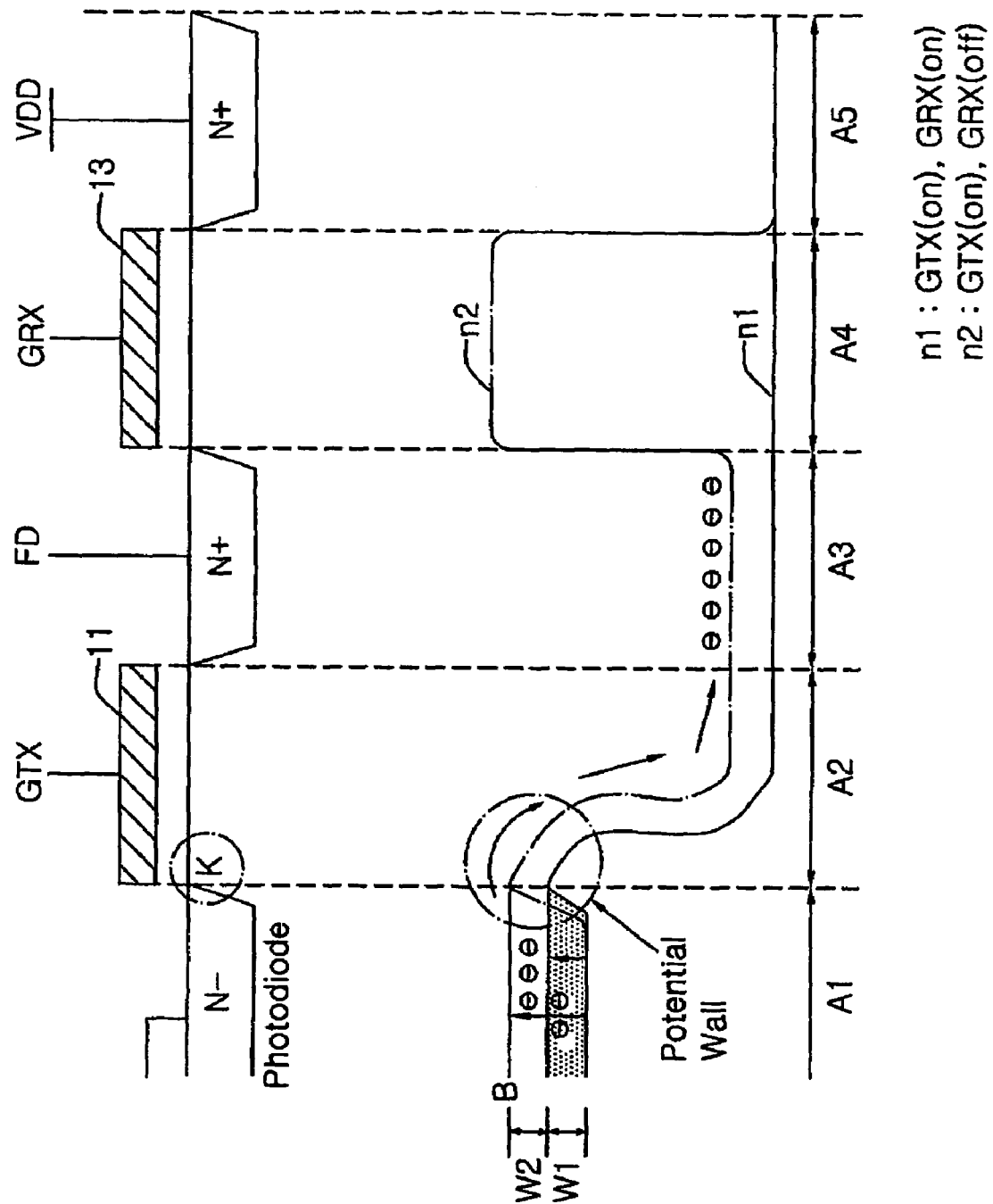
FIG. 2 is a view illustrating the 4-transistor CMOS active pixel to explain a section of a photodiode and electronic potential for each area based on the timing diagram of FIG. 1.
Figure 9:
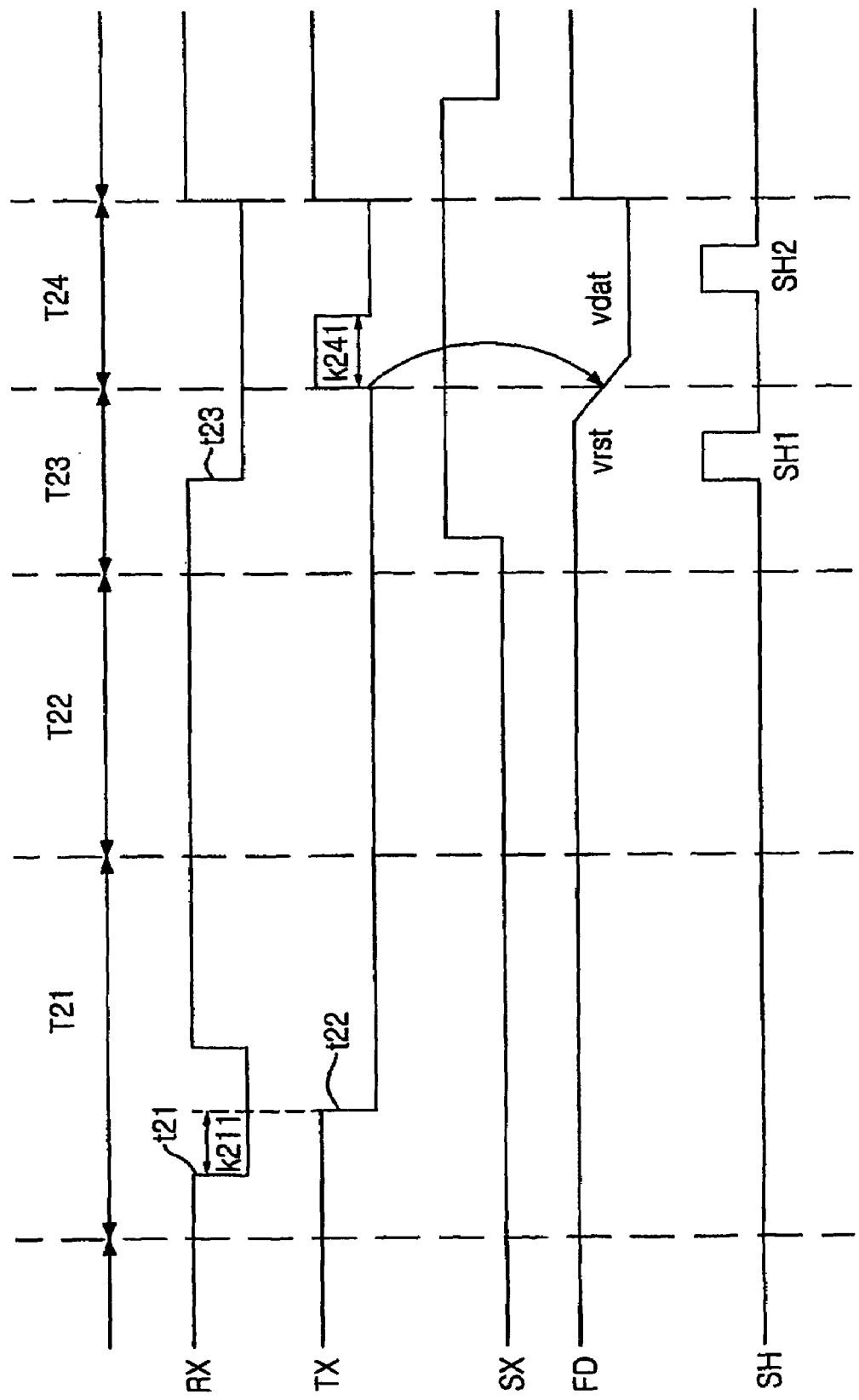
FIG. 9 is a circuit diagram of signals to drive the image sensor using a 4-transistor CMOS active pixel of FIG. 8.

FIG. 9 is a circuit diagram of signals to drive the image sensor using a 4-transistor CMOS active pixel of FIG. 8. As shown in FIG. 9, the reset transistor 87 and the transmission transistor 85 are simultaneously turned on at the initial stage of a section T21. Thus, in the initial portion of the section T21, the collection node SUM connected to the photodiode PH is initialized. The section T21 is a section where light is not sensed and will be referred to as "a preliminary section" in the present specification. Then, the reset control signal RX is deactivated at a point t21 and the transmission control signal TX is deactivated at a point t22. As the photodiode PH reacts to external light, signal charges are accumulated at the collection node SUM. In the present specification, a region k211 from the point t21 when the reset control signal RX is deactivated to the point t22 when the transmission control signal TX is deactivated is referred to as "a first equalization region". Next, a section T22 is performed. In the section T22 which corresponds to the section T12 of FIG. 1, the signal charges are accumulated at the collection node SUM as a pixel of the image sensor reacts to light.

Next, a section T23 is performed. In the section T23 which corresponds to the section T13 of FIG. 3, the voltage of the data line DL corresponding to a reset level vrst of the floating diffusive node FD is sampled in an activation region SH1 of the sampling signal SH. In the present specification, the section T23 is referred to as "a reset sampling section".

Sequentially, a section T24 is performed. In the section T24 which corresponds to the section T14 of FIG. 3, the voltage of the data line DL corresponding to a data level vdat is sampled. That is, the charges accumulated at the collection node SUM are transmitted to the floating diffusive node FD during an activation region k241 of the transmission control signal TX. The voltage of the data line DL corresponding to the data level vdat of the floating diffusive node FD is sampled in the activation region SH2 of the sampling signal SH. In the present specification, the section T24 is referred to as "a data sampling section".

Figure 3:
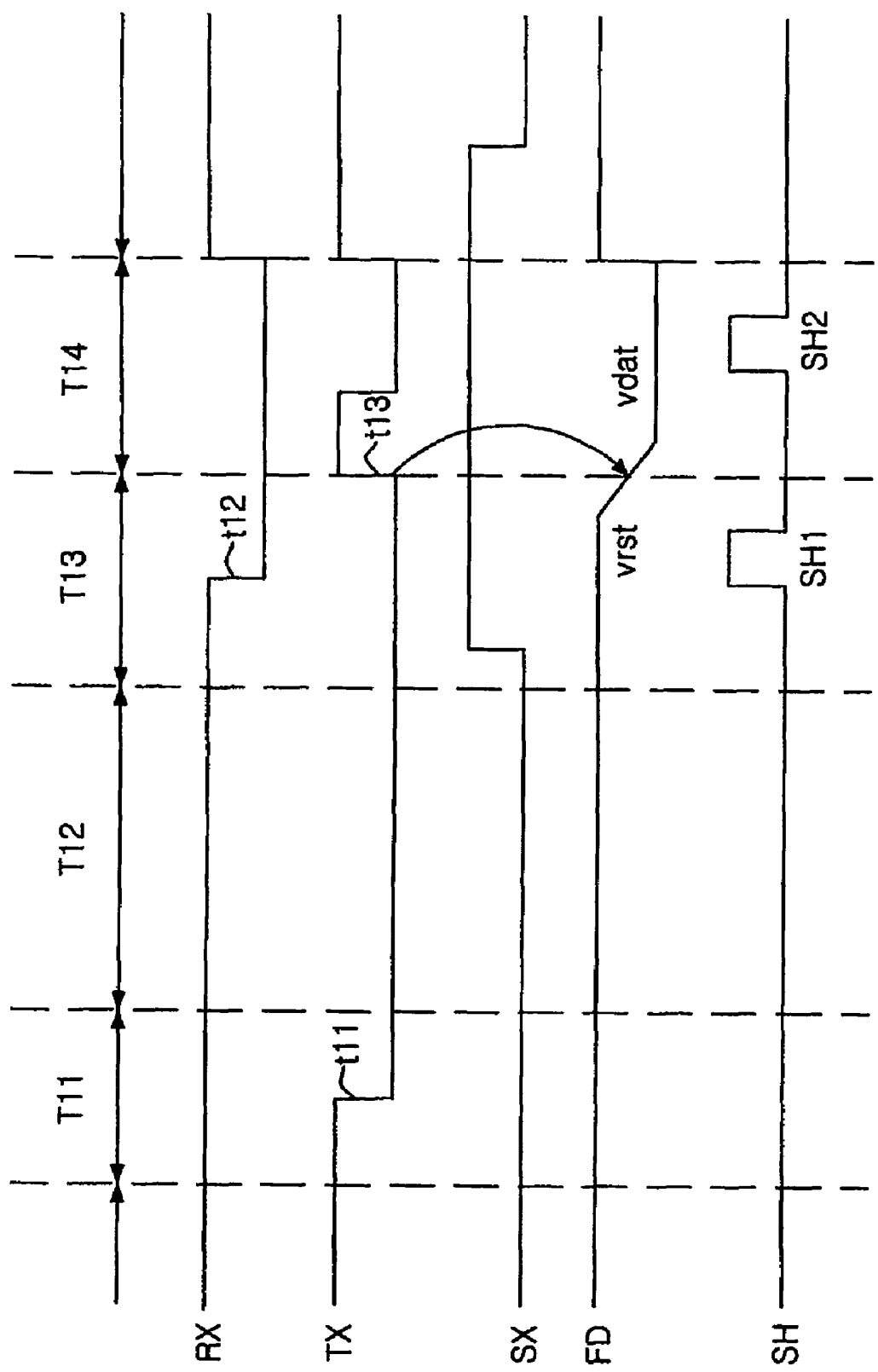
FIG. 3 is another timing diagram of driving an image sensor using the 4-transistor CMOS active pixel.

The preferred embodiment of FIG. 9 has a following difference in the preliminary section T21, compared to the conventional technology shown in FIG. 3. That is, the section T21 includes the first equalization region k211 where the reset control signal RX is deactivated and the transmission control signal TX is activated. In the first equalization region k211, the transmission transistor T25 is turned on so that the voltage of the collection node SUM approximates to the reset level vrst of the floating diffusive node FD. Thus, the difference between the initial voltage of the collection node SUM and the voltage of the reset level is reduced by about ½, compared to the conventional technology of FIG. 3.

Figure 10:
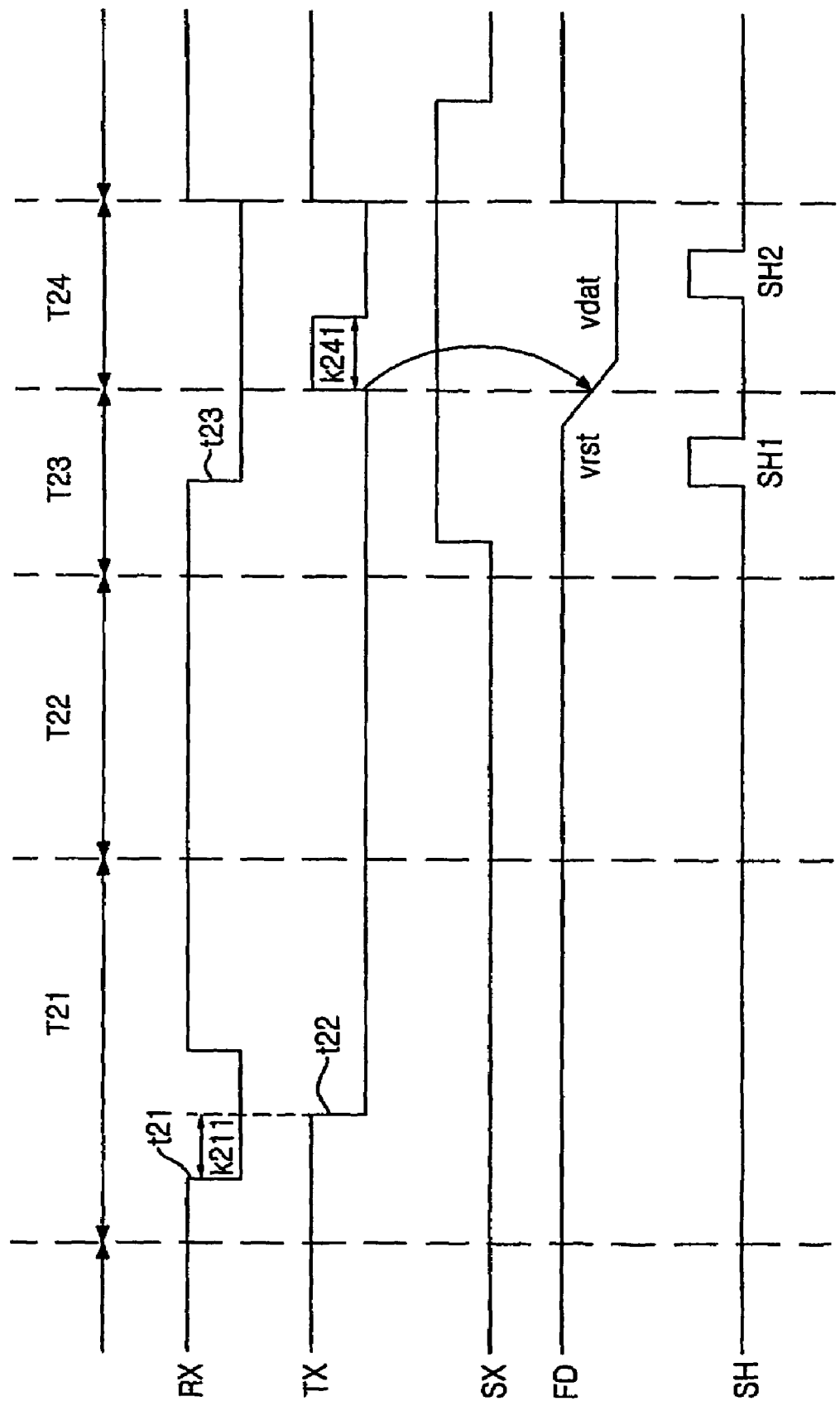
FIG. 10 is a timing diagram obtained by modifying the timing diagram of FIG. 9.

FIG. 10 is a timing diagram obtained by modifying the timing diagram of FIG. 9. The timing diagram of FIG. 10 is substantially the same as that of FIG. 9, except for the number of equalizing the collection node SUM and the floating diffusive node FD. That is, in the preliminary section T21 of FIG. 9, only the first equalization region k211 is performed. However, in a preliminary section T31 of FIG. 10, after a first equalization region k311 is performed, a separation region k312 and a second equalization region k313 are performed. That is, in the separation region k312, the transmission control signal TX is deactivated and the reset control signal RX is activated to "high". In the separation region k312, the charges of the floating diffusive node FD changed by the signal charges transmitted to the collection node SUM during in the first equalization region k312 are recovered to the reset level vrst. In the second equalization region k312, the equalization of the collection node SUM and the floating diffusive node FD is performed. In FIG. 10, as two times of the equalization regions (k311 and k313) are performed, the difference between the initial voltage of the collection node SUM and the voltage of the reset level is reduced by about ½₂, compared to the conventional technology of FIG. 3.

The number of the equalization regions in the reset section T31 can be increased. If the number of the equalization regions in the reset section T31 is increased to "n" ("n" is an integer which is 3 or more), the difference between the initial voltage of the collection node SUM and the voltage of the reset level is reduced by about ½₂, compared to the conventional technology of FIG. 3.

Figure 11:
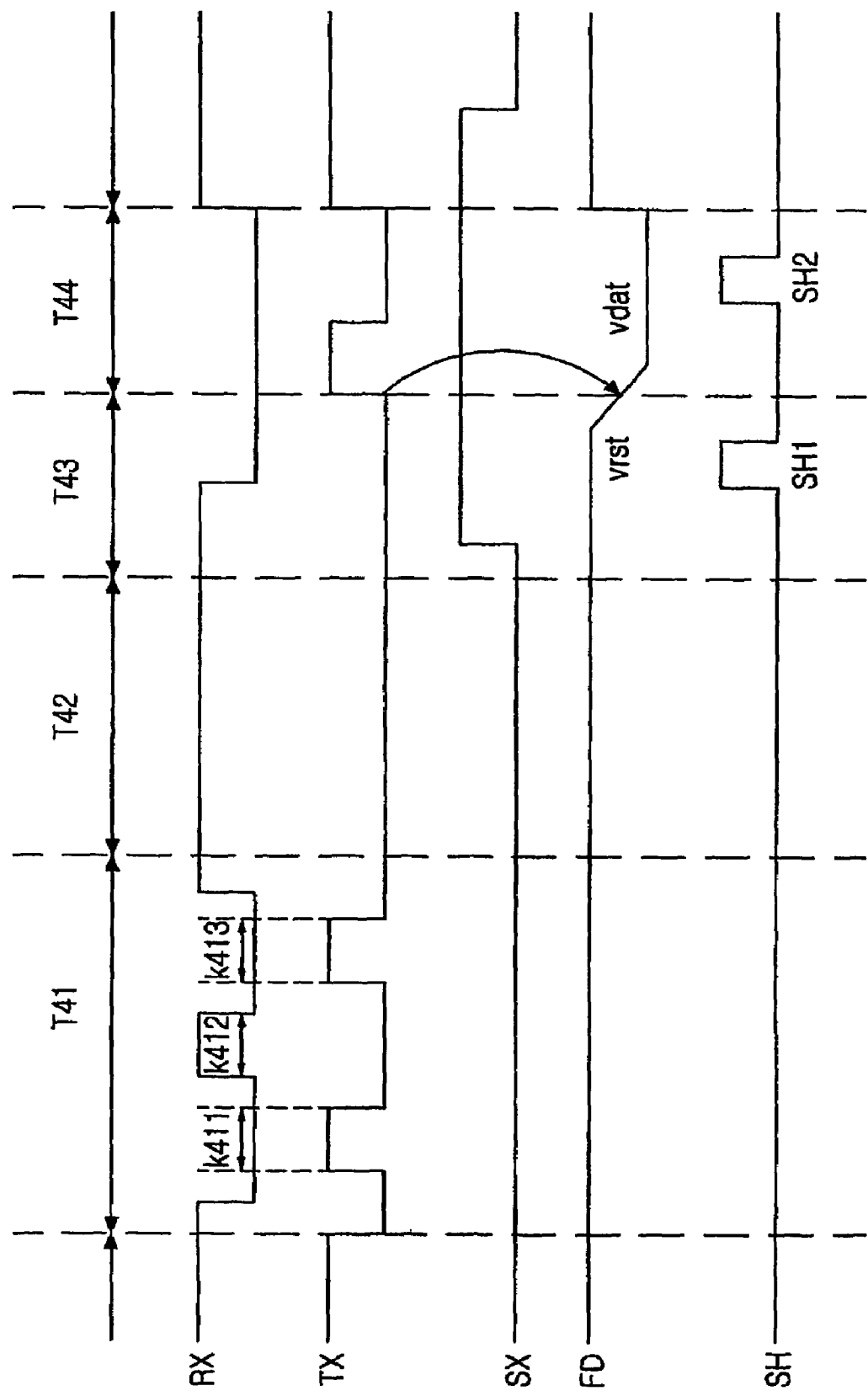
FIG. 11 is a timing diagram obtained by modifying the timing diagram of FIG. 10.

FIG. 11 is a timing diagram obtained by modifying the timing diagram of FIG. 10. The timing diagram of FIG. 11 is substantially the same as that of FIG. 10. However, while the deactivate of the reset control signal RX is realized when the transmission control signal TX is a state of being activated to "high" in FIG. 10, the deactivate of the reset control signal RX is realized when the transmission control signal TX is a state of being activated to "low" in FIG. 11. Then, in FIG. 11, a first equalization region k411, a separate region k412, and a second equalization region k413 are performed. That is, two times of equalization regions (k411 and k412) are generated. Since the effect according to the timing diagram of FIG. 11 is substantially the same as that of FIG. 11, a detailed description thereof will be omitted.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

As described above, since the timing of the transmission control signal and the reset control signal generated in the read-out section are performed in advance, a potential wall between the photodiode area and the transmission transistor having a size corresponding to one generated in the read-out section is generated in the reset section in advance and the photodiode area is filled with charges. Thus, a dead region is reduced in the read-out section. Thus, a minimum light amount characteristic of an image sensor is improved.

Also, in the reset section, the transmission transistor connecting the collection node to accumulate the signal charges generated from the photodiode and the floating diffusive node is turned on once or two times or more. Thus, a difference between the initial voltage of the collection node and the voltage of the reset level of the floating diffusive node is much reduced. Therefore, the low brightness characteristic of the image sensor is remarkably improved according to the method of driving a CMOS active pixel according to the present invention.

What is claimed is:

1. A method of driving a complementary metal oxide semiconductor active pixel which includes a photodiode generating signal charges according to received photons at a predetermined collection node, a transmission transistor providing the signal charges to a predetermined floating diffusive node in response to a predetermined transmission control signal, the floating diffusive node receiving the signal charges transmitted by the transmission transistor, a reset transistor resetting the floating diffusive node in response to a predetermined reset control signal, a driving transistor controlled by a voltage level of the floating diffusive node, and a select transistor transmitting the voltage transmitted by the driving transistor to a corresponding data line in response to a predetermined row select signal, the method comprising:

(a) performing a reset sampling section to sample a reset level of the data line according to a voltage of the reset floating diffusive node;

(b) performing a data sampling section to transmit the signal charges generated in the photodiode to the floating diffusive node and sample a data level of the data line according to a voltage of the floating diffusive node which is determined by the signal charges; and (c) performing a preliminary section to match the voltage of the collection node before the action (b) is performed and the voltage of the floating diffusive node after the action (b) is performed, wherein the preliminary section comprises a first equalization region in which the reset control signal is deactivated and the transmission control signal is activated.

2. The method of claim 1, wherein the preliminary section further comprises:

a separation region in which the transmission control signal is deactivated and the reset control signal is activated, after the first equalization region is performed; and a second equalization region in which the reset control signal is deactivated and the transmission control signal is activated, after the separation region is performed.

3. A method of driving a complementary metal oxide semiconductor active pixel which includes a photodiode generating signal charges according to received photons at a predetermined collection node, a transmission transistor providing the signal charges to a predetermined floating diffusive node in response to a predetermined transmission control signal, the floating diffusive node receiving the signal charges transmitted by the transmission transistor, a reset transistor resetting the floating diffusive node in response to a predetermined reset control signal, a driving transistor controlled by a voltage level of the floating diffusive node, and a select transistor transmitting the voltage transmitted by the driving transistor to a corresponding data line in response to a predetermined row select signal, the method comprising:

(a) performing a reset sampling section to sample a reset level of the data line according to a voltage of the reset floating diffusive node;

(b) after the action (a), performing a data sampling section to transmit the signal charges generated in the photodiode to the floating diffusive node and sample a data level of the data line according to a voltage of the floating diffusive node which is determined by the signal charges; and (c) performing a preliminary section to match the voltage of the collection node before the action (b) is performed and the voltage of the floating diffusive node after the action (b) is performed, wherein the preliminary section comprises a preparation region in which the reset control signal is deactivated in a state in which the transmission control signal is deactivated.

4. The method of claim 3, wherein the preliminary section further comprises:

a first equalization region in which the reset control signal is deactivated and the transmission control signal is activated, after the preparation section is performed;

a separation region in which the transmission control signal is deactivated and the reset control signal is activated, after the first equalization region is performed; and a second equalization region in which the reset control signal is deactivated and the transmission control signal is activated, after the separation region is performed.

* * * * *